United States Patent [19]

Weiland

[11] Patent Number: 4,671,218
[45] Date of Patent: Jun. 9, 1987

[54] TWO STROKE ENGINE WITH DEFLECTOR VALVE

[76] Inventor: Carl Weiland, 1769 Golf Ridge Dr., Bloomfield Hills, Mich. 48013

[21] Appl. No.: 764,480

[22] Filed: Aug. 12, 1985

Related U.S. Application Data

[63] Continuation-in-part of Ser. No. 710,273, Mar. 11, 1985, abandoned.

[51] Int. Cl.$^4$ .......................... F02B 25/04; F01L 3/06
[52] U.S. Cl. ............................. 123/65 V; 123/65 BA; 123/65 P; 123/188 VA
[58] Field of Search ............. 123/65 R, 65 A, 65 BA, 123/65 P, 65 PE, 65 VB, 65 VC, 65 WV, 188 R, 188 A, 188 AA, 188 VA, 332, 333, 188 AF, 65 V, 306

[56] References Cited

U.S. PATENT DOCUMENTS

| | | | |
|---|---|---|---|
| 1,081,228 | 12/1913 | Fuchs | 123/188 VA X |
| 1,868,138 | 7/1932 | Fisk | 123/188 A |
| 2,067,984 | 1/1937 | Ross | 123/65 BA X |
| 2,405,350 | 8/1946 | Gadoux et al. | 123/65 BA |
| 2,785,667 | 3/1957 | Miller | 123/65 VB X |
| 2,787,992 | 4/1957 | Flint | 123/188 VA |
| 2,891,527 | 6/1959 | Dolza | 123/332 |
| 3,161,182 | 12/1964 | Albinson et al. | 123/65 BA X |
| 3,987,769 | 10/1976 | Yew | 123/188 VA X |

Primary Examiner—Willis R. Wolfe, Jr.
Attorney, Agent, or Firm—Lloyd M. Forster

[57] ABSTRACT

Two stroke gasoline spark ignition supercharged engine wherein air scavenging takes place without loss of fuel and full charge of air and fuel at optimum combustion ratio takes place for each power stoke with flywheel smoothed interrupted fuel injection for reduced power requirements. A modified valve design having a deflector lip is disclosed which further improves scavenging over the standard valve configuration.

4 Claims, 8 Drawing Figures

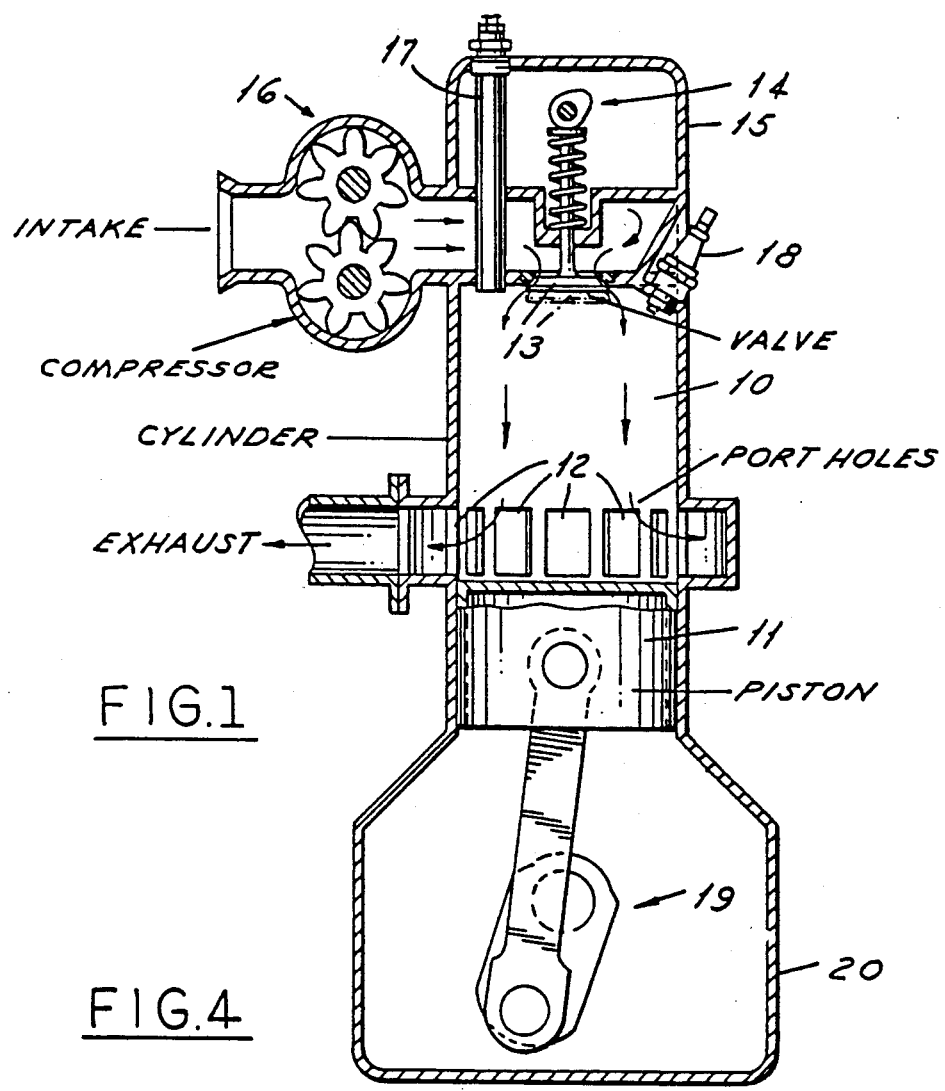
FIG.1
FIG.4
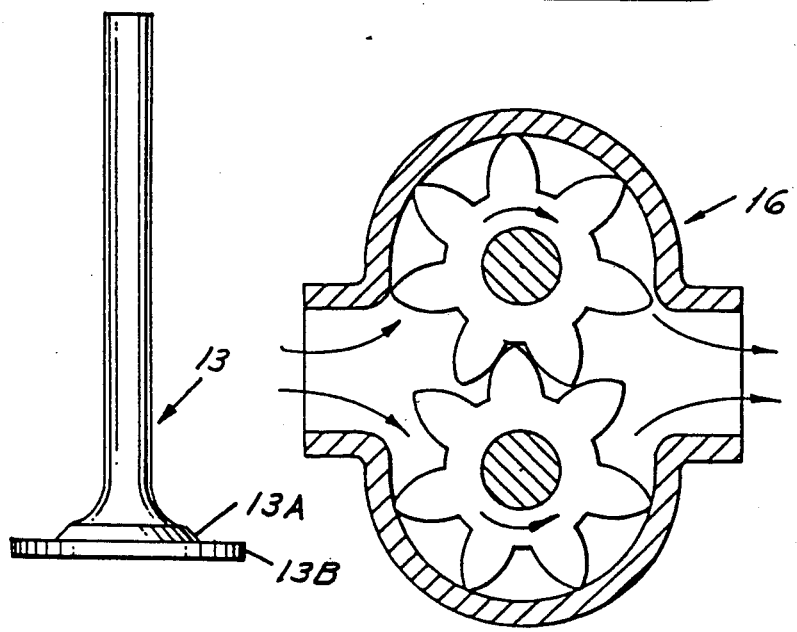
FIG.2

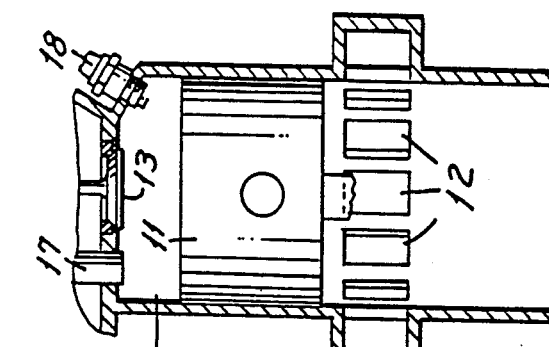
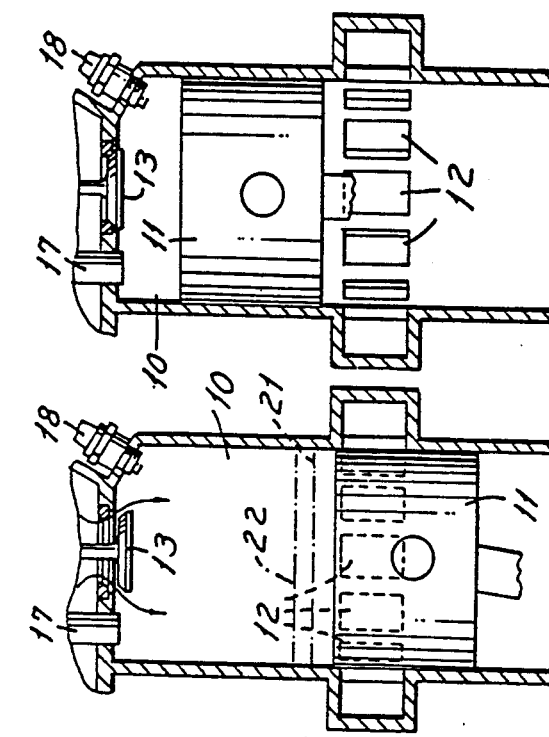
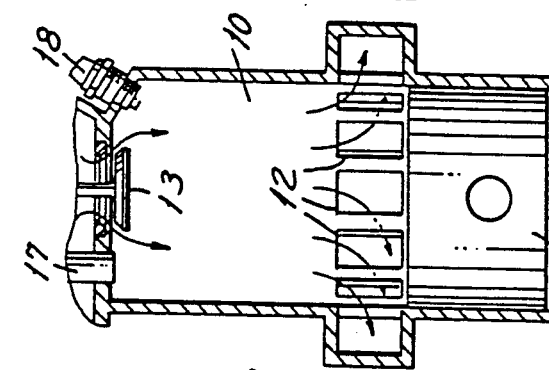
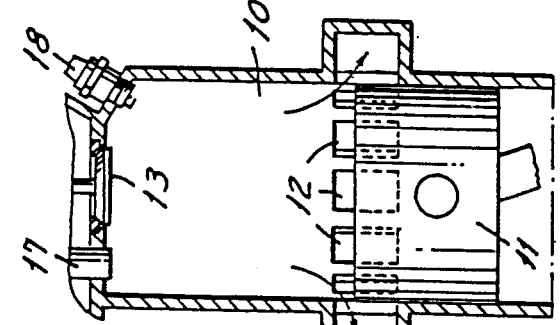
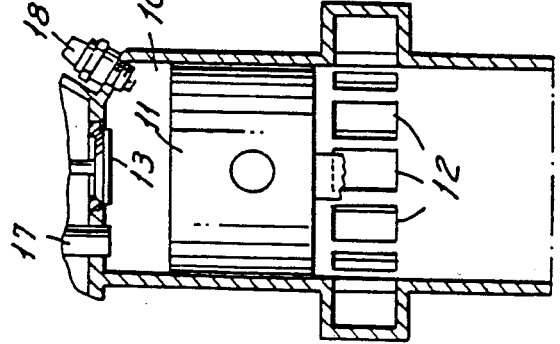

TWO STROKE ENGINE WITH DEFLECTOR VALVE

PRIOR RELATED APPLICATION

This application is a continuation-in-part of application Ser. No. 710,273 filed Mar. 11, 1985, now abandoned, entitled "Two Stroke Gasoline Engine."

BACKGROUND OF THE INVENTION

Conventional two stroke gasoline engines in current use, as in the outboard motor and lawnmower market, are extremely simple employing only three moving parts per cylinder, but lack efficiency as compared to four stroke engines. This is primarily due to scavenging the cylinder with a mixture of air and fuel with considerable loss of unused fuel through the exhaust.

Partial scavenging with compressed air before fuel injection has been suggested in a two cycle internal combustion engine disclosed in U.S. Pat. No. 2,425,157. Fuel is injected into a continuously air pressurized intake port uncovered by the piston near the bottom of its stroke. The exhaust port is valve controlled. A cam is timed so that it opens the fuel nozzle and permits fuel to be admitted into the fuel pipe and cylinder slightly later than the opening of the intake and exhaust ports. Admittance of the fuel will be completed slightly before the intake port is closed on the up stroke of the piston.

Another approach to scavenging with compressed air prior to fuel injection has been disclosed in U.S. Pat. No. 2,887,993 wherein pressurized air is introduced through a plurality of small circumferentially spaced ports in the cylinder wall uncovered by the piston near the bottom of its stroke with a valve controlled exhaust port. Such patent discloses a spark ignition engine wherein a full charge of air is drawn in during an air intake period and spill metering is applied to get rid of whatever portion of the air cannot be used. This is accomplished by retarding the closing of the exhaust valve during the compression stroke. The quantity of fuel injected into the cylinder is controlled by a fuel injection pump and the engine enables both air and fuel to be decreased as the load is decreased in order to maintain an efficient mixture ratio and reduce pumping losses. Intake air is moved into the cylinder and the excess air is moved out of the cylinder during the compression stroke through the exhaust valve and after excess air is moved out of the cylinder, the exhaust valve is closed, fuel is injected into the cylinder, the spark plug ignites the mixture and the piston is moved in the opposite direction. Thereafter the exhaust valve opens resulting in the discharge of the exhaust gases.

BRIEF DESCRIPTION OF THE PRESENT INVENTION

In applicant's construction exhaust ports are opened in the cylinder wall near the bottom of the piston stroke and an intake valve in the cylinder head controls admission of air supercharged through a positive displacement crankshaft driven air compressor. Spark ignition at or near the top of the compression stroke is conventional. Near the bottom of the power stroke of the piston, initial opening of the exhaust ports provides pre-exhaust prior to intake valve opening whereafter compressed air is admitted to fully scavenge the cylinder. The intake valve remains open until exhaust ports are fully closed by upward stroke of the piston and slightly thereafter to effect supercharging of air within the cylinder whereupon the intake valve closes and fuel injection takes place under a full charge of air and fuel at optimum combustion ratio in the order of 14 or 15:1 by weight. Maximum power at peak efficiency is produced on each power stroke and fuel interruption combined with adequate flywheel to smooth power and no-power stroke operation is employed to meet partial power requirements. An improved valve design with a deflector lip below the valve seat is provided to direct air coming into the cylinders of the engine in a horizontal direction to perfect the scavenging of the cylinder under all running conditions and prevent any "dead vortexes" containing exhaust gases from remaining at the top outer extremities of the combustion chamber.

BRIEF DESCRIPTION OF THE DRAWINGS

FIG. 1 is a diagrammatic sectional view of a two cycle gasoline spark ignition single cylinder engine constructed in accordance with the present invention;

FIG. 2 is a sectional view of a positive displacement compressor for the engine;

FIGS. 3 (a)-(e) show five stages of operation in the complete cycle of a single crankshaft revolution; and FIG. 4 is an elevational view of an improved valve design embodied in the construction of the present invention.

With reference to FIG. 1 the engine comprises cylinder chamber 10, piston head 11, exhaust ports 12, air intake valve 13, camshaft 14, cylinder head 15, air compressor 16, fuel injector 17, spark plug 18, piston crankshaft 19, and crankcase 20.

As previously indicated, with reference to FIG. 1 it is contemplated that the engine run at full power for every stroke in which fuel injection takes place; that positive displacement compressor 16 will be driven by gearing from crankshaft 19 to provide a constant supply of supercharged air in cylinder head 15 above valve 13; that a full charge of air and fuel will be delivered to the cylinder for every power stroke to effect an optimum combustible ratio air to fuel in the order of 14 or 15:1 by weight; and that fuel injection at 17 will be interrupted on a variable percentage of piston cycles by control means known in the art to meet reduced power demands for the engine with provision of appropriate flywheel to smooth the operation of the engine over power and interrupted power cycles.

With reference to FIG. 3(a), spark plug 18 ignites a compressed fuel-air mixture in cylinder chamber 10 above piston head 11 at or near the top of the piston stroke in accordance with conventional practice.

With reference to FIG. 3(b) at the end of the power stroke, near the bottom of piston travel, pre-exhaust is effected by piston head 11 uncovering exhaust ports 12 reducing cylinder pressure to compressor air pressure before valve 13 is opened.

With reference to FIG. 3(c), valve opening and continued downward travel of piston 11 further uncovering ports 12 causes air scavenging of exhaust gases with direct flow from the top of cylinder 10, complete scavenging being effected without loss of fuel for the next power stroke.

Since the scavenging of burned exhaust gases is highly important to the efficiency of two-cycle internal combustion engines, to provide optimum efficiency under all operating conditions, the modified valve design shown in FIG. 4 may be used in a preferred embodiment in place of the standard valve. As can be seen by referring to FIG. 4, the modified valve 13 is provided with horizontal annular deflector lip 13B immediately adjacent the valve seat 13A with increased diameter of approximately 50%. It can be seen that this will then direct the air coming from the compressor 16 in a horizontal direction within the cylinder when the valve 13 is opened by the cam shaft 14. With the air traveling in a horizontal direction, the scavenging is improved to assure that there are no "dead vortexes" left in the upper part of the cylinder.

With reference to FIG. 3(d), valve 13 remains open during return of piston head 11 to the position shown completely closing off the exhaust ports and thereafter during a slight further upward travel, e. g. to a position such as shown at dotted line 21 where fresh air has filled the cylinder at supercharged pressure whereupon valve 13 closes before compression can produce back flow against the supercharged air pressure of the compressor. When valve 13 has completely closed and piston head 11 has further advanced to a position such as shown by dotted line 22, fuel injection at 17 takes place and compression of the charge continues to the top of the piston stroke for completion of the cycle as shown in FIG. 3(e) where conventional ignition at 18 again takes place.

In a fuel interrupted cycle the same sequency of piston travel, valve opening and valve closing directly timed by crankshaft driven camshaft 17 takes place with simple omission of fuel injection. Because full air charge is provided for every cycle and full corresponding fuel injection for every power stroke, optimum efficiency is obtained as compared with throttled engines, or as compared with the variable air and fuel charges such as provided in the U.S. Pat. No. 2,887,993 disclosure. Furthermore, the simplicity of directly geared compressor and camshaft from crankshaft drive result in a relatively inexpensive as well as highly efficient engine, particularly true in comparison with any of the conventional two-cycle gasoline engines where scavenging involves a partial loss of fuel injection for the following cycle.

From the foregoing description it will be understood that the improved two stroke engine disclosed herein provides high fuel efficiency because completely scavenged with air instead of fuel-air mixture; uniflo scavenging with total removal of combustion residue because of valve in cylinder head and excess provided from compressor; high output of power per cylinder displacement, almost twice that of four stroke engine; high mechanical efficiency through spark plug ignition operating with gasoline avoiding high compression ratio of diesels; lightness for given power output; low manufacturing expense for given power output; fuel injection in the cylinder when closed on both ends and air at low initial compression pressure; and higher volumetric power output than any known internal combustion engine.

While spark ignition with gasoline fuel is preferred, the engine can be converted to diesel operation by employing appropriate heavy duty construction and self-igniting diesel compression ratio.

With regard to interruption of fuel injection for modulating power, state of the art controls responsive to accelerator or similar operator control may be employed, with appropriate flywheel, to interrupt fuel injection for a variable percentage of cycles decreasing with increasing power demand.

I claim:

1. Two stroke internal combustion cylinderpiston engine characterized by, means for admitting full supercharged air and injected fuel into closed cylinder for every power stroke, and means for full air scavenging of cylinder at the end of each power stroke prior to fuel injection, said engine having means for gasoline and spark ignition operation with valve in cylinder head controlled air port and piston uncovered cylinder exhaust ports, said valve having an annular valve seat and an outward deflector lip adjacent and having a diameter approximately 50% greater than said seat.

2. Two stroke internal combustion engine comprising cylinder with cylinder head closure at one end, piston with crankshaft driven means for reciprocating within said cylinder to compress a fuel air mixture during its compression stroke and to deliver power upon ignition during its power stroke, a plurality of circumferentially spaced exhaust ports in the wall of said cylinder uncovered by said piston near the end of its power stroke, port means in said cylinder head closure with valve means for controlling port communication with said cylinder, compressor means for delivering supercharged air to one of said port means, the other of said port means being connected to exhaust, means for injecting fuel to said cylinder during the compression stroke of said piston, means for igniting the compressed fuel-air mixture for each power stroke of said engine, means for initiating exhaust port communication with said cylinder near the end of said power stroke while said other port is closed, means for opening both ports to provide through air flow to scavenge said cylinder with compressed air at the end of the said power stroke, means for closing said exhaust port while said other port remains open to admit supercharged air into cylinder, and means for closing said other port during the compresion and power stroke of said piston, said valve means having an annular valve seat and an annular outward deflector lip adjacent and having a diameter approximately 50% greater than said valve seat.

3. Two stroke internal combusiton engine comprising cylinder with cylinder head closure at one end, piston with crankshaft driven means for reciprocating within said cylinder to compress a fuel air mixture during its compression stroke and to deliver power upon ignition during its power stroke, a plurality of circumferentially spaced exhaust ports in the wall of said cylinder uncovered by said piston near the end of its power stroke, port means in said cylinder head closure with valve means for controlling port communication with said cylinder, compressor means for delivering supercharged air to one of said port means, the other of said port means being connected to exhaust, means for injecting fuel into said cylinder during the compression stroke of said piston, means for igniting the compressed fuel-air mixture for each power stroke of said engine, means for initiating exhaust port communication with said cylinder near the end of said power stroke while said other port is closed, means for opening both ports to provide through air flow to scavenge said cylinder with compressed air at the end of the said power stroke, means for closing said exhaust port while said other port remains open to admit supercharged air into cylinder, and means for closing said other port during the compression and power stroke of said piston, said valve means having an annular valve seat and a horizontally extendingintegral annular outward deflector lip adjacent and of substantial greater diameter than said valve seat projecting in flush relation with the end of said valve seat.

4. Engine of claim 3 including a horizontally extending integral deflector lip having a diameter approximately 50% greater than and projecting in flush relation with the end of said valve seat.

* * * * *